US007048187B1

(12) United States Patent
Yu

(10) Patent No.: US 7,048,187 B1
(45) Date of Patent: May 23, 2006

(54) STRUCTURE FOR SOCKET OF MULTI-CARD READER

(75) Inventor: Yu An Yu, Taipei (TW)

(73) Assignee: Northstar Systems Corp. (TW)

( * ) Notice: Subject to any disclaimer, the term of this patent is extended or adjusted under 35 U.S.C. 154(b) by 0 days.

(21) Appl. No.: 11/045,305

(22) Filed: Jan. 31, 2005

(51) Int. Cl.
*G06K 7/08* (2006.01)
*G06K 7/00* (2006.01)

(52) U.S. Cl. .................. 235/451; 235/439; 235/440; 235/486

(58) Field of Classification Search ............. 235/439, 235/440, 451, 475, 483–486

See application file for complete search history.

(56) References Cited

U.S. PATENT DOCUMENTS

| 5,336,877 A * | 8/1994 | Raab et al. .............. 235/475 |
| 6,145,748 A * | 11/2000 | Neifer et al. ............. 235/486 |
| 6,352,445 B1 * | 3/2002 | Takei et al. .............. 439/489 |

\* cited by examiner

*Primary Examiner*—Michael G. Lee
*Assistant Examiner*—Jamara A. Franklin
(74) *Attorney, Agent, or Firm*—Bacon & Thomas PLLC

(57) ABSTRACT

The present invention is a structure for socket of multi-card reader, which is a socket of card reader that supports the insertion of memory cards with distinct specifications. The said socket of card reader is composed of a socket body, an upper cover, one or more than one read-protection device, and multiple connecting terminals. To meet the need for adapting to multiple cards, a read-protection device is installed inside the socket body. The said read-protection device permits or forbids the action of free rotating and thereby differentiates the feasibility for reading according to the respective thicknesses of memory cards with distinct specifications.

3 Claims, 4 Drawing Sheets

STRUCTURE FOR SOCKET OF MULTI-CARD READER

BACKGROUND OF THE INVENTION

1) Field of the Invention

The present invention is a structure for socket of multi-card reader, which is a socket of card reader that supports the insertion of memory cards with distinct specifications. Inside the socket body a rotatable read-protection device is provided. The said read-protection device uses concave part and bumps to differentiate memory cards with distinct specifications/thicknesses in order to prevent mis-contact of terminals as well as damage caused by insertion of memory card with distinct specification.

2) Description of the Prior Art

The memory cards with flash memory have diverse specifications. To meet the need, manufacturers have developed socket of card readers for distinct specifications. Consequently, card reader that accepts distinct cards was introduced to solve the problem of memory cards with distinct specifications. It is possible to differentiate memory cards with distinct specifications by identifying the shape, thickness, width, depth (length), or the position of contact terminals. However, generally speaking, memory card readers nowadays barely make use of the positional difference of insertion tracks or amount of contacting terminals as well as different initializing terminals to differentiate memory cards with distinct specifications.

Although the mechanism of distinct cards sharing one slot has been developed to scale down the size of card reader. The connecting terminals in such a mechanism are typically arranged in layers, the mis-contact between connecting terminals and memory card may happen when memory cards with the same or similar thicknesses are inserted. Since the power of memory card is supplied from the card reader side and current must flow through the contacting terminals, a short circuit or damage may accordingly occur in the memory card or in the card reader whenever a mis-contact takes place.

SUMMARY OF THE INVENTION

Based on these observations, the primary objective of a structure for socket of multi-card reader according to the present invention is to introduce a socket of card reader for inserting distinct memory cards, which utilizes the design of read-protection device to differentiate memory cards with distinct specifications e, and thus scales down the size of the whole socket of card reader.

Therefore, the present invention not only integrates card readers of distinct specifications, but significantly scales down the size of the whole socket of card reader as well, which corresponds the necessary condition of patent pending. The detailed descriptions as well as the technical contents of the present invention shall be given with the accompanying drawings hereunder:

DETAILED DESCRIPTION OF THE PREFERRED EMBODIMENTS

Figure 1:
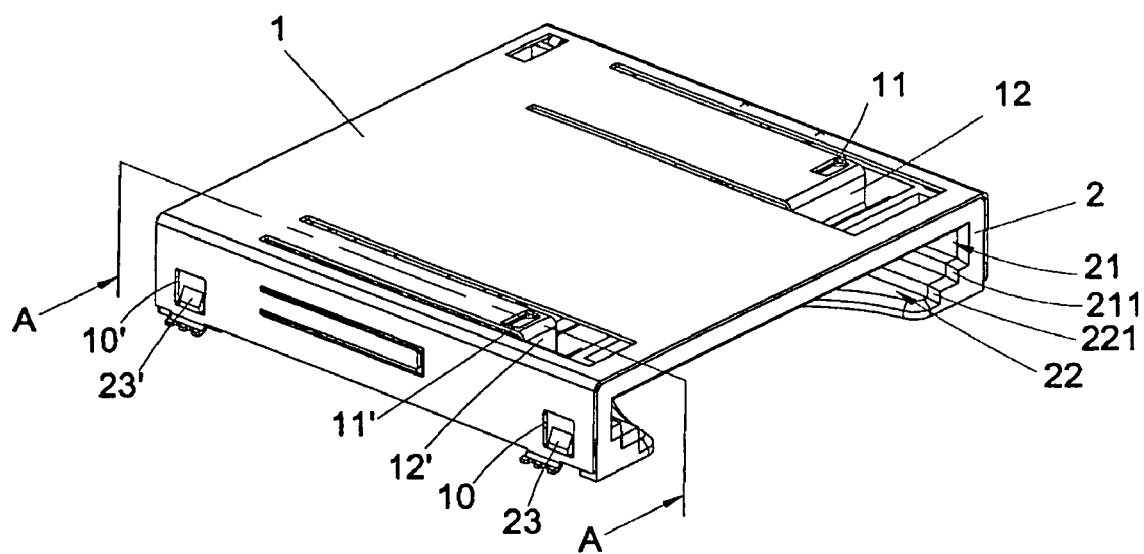
FIG. 1 shows a pictorial drawing according to the present invention.
Figure 2:
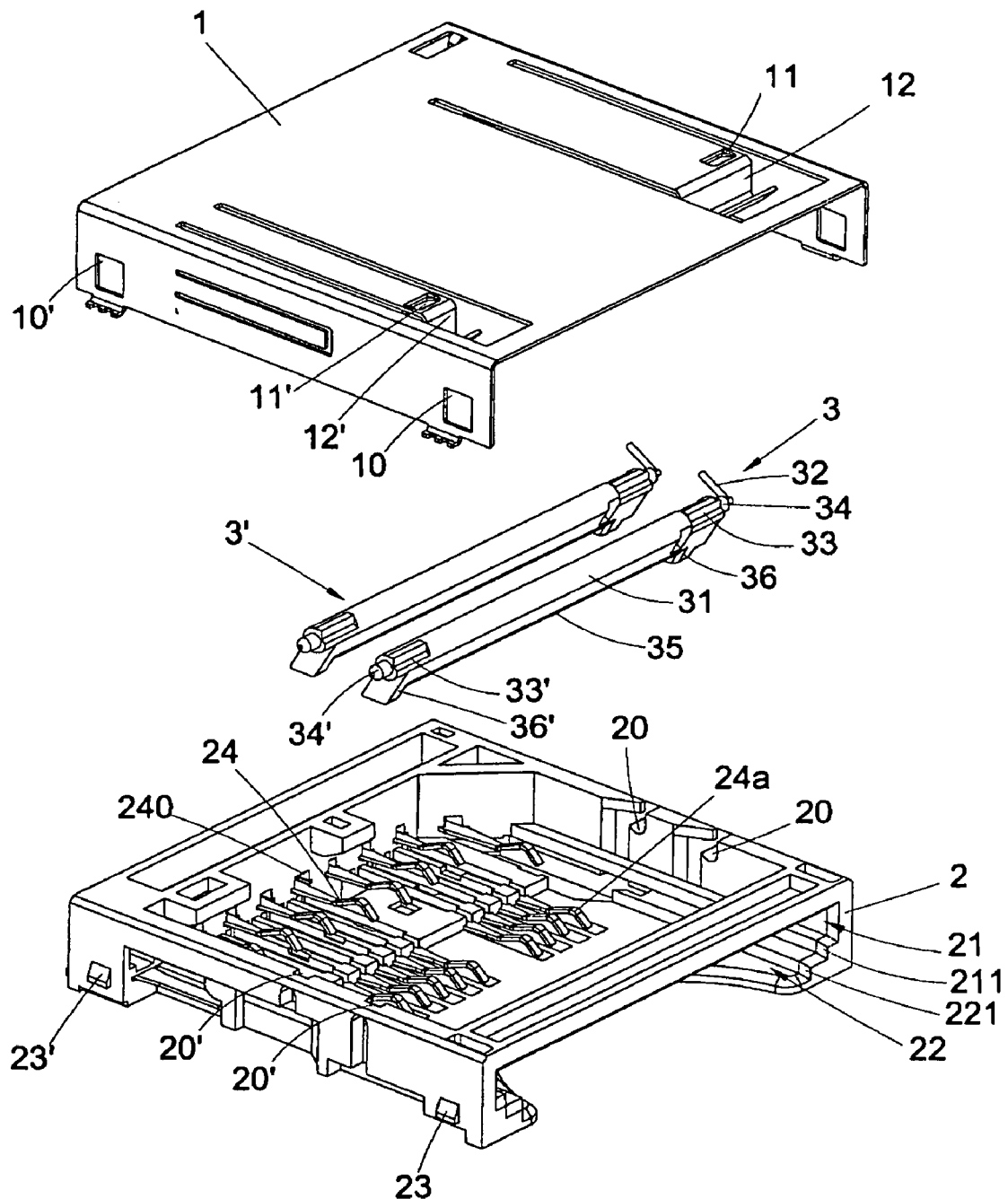
FIG. 2 shows an exploded 1 view according to the present invention.

Referring to FIGS. 1 and 2, in which the socket of card reader according to the invention at least includes an upper cover 1, a socket body 2, two read-protection devices 3, 3', and multiple connecting terminals 24, 24a, in which the upper cover 1 is a cover with bottom oriented upwards, and lock holes 10, 10' are provided at the side wall of upper cover 1 to be corresponding to the lock parts 23, 23' at the side wall of socket body 2 for locking and combining. Further, at both sides atop the upper cover 1 elastic lock parts 12, 12' are installed, where resist lock parts 11, 11' are provided behind the elastic lock parts 12, 12' to resist the resist slots 33, 33' of slider 31 in order to permit or forbid the free rotation of slider 31. When the locations of elastic lock parts 12, 12' correspond to the upper and lower slots 21, 22 of socket body 2, the insertion of a memory card with specified specification is constrained, which is used for differentiating memory cards with distinct specifications and thus allows the insertion of memory card with specified specifications.

The upper and lower slots 21, 22 are provided at both sides inside the socket body 2. By way of the design of height-drops 211, 221, the upper and lower slots 21, 22 allow the insertion of memory cards with distinct specifications. Besides, at the back wall inside the socket body 2 multiple through holes 240 are provided for embedding connecting terminals 24, 24a. As the contact positions are different, the connecting terminals 24, 24a are differentiated in reference to their contact positions to a memory card with specified specification.

On both walls of the upper and lower slots 21, 22 corresponding axle bases 20, 20' are provided for pivoting read-protection devices 3, 3', where the read-protection device 3 includes a slider 31, which provides a recovery device 32 at the axle part 34 of one side, and which is installed at corresponding axle bases 20, 20'. The recovery device 32 can be embodied on a return spring, a tension spring, or a terminal hook spring, such that the slider 31 can be recovered rotationally on the axle bases 20, 20'. Moreover, the said slider 31 provides a concave part 35 at the bottom, and bumps 36, 36' are formed at both sides of concave part 35, where the width span of concave part 35 corresponds to a memory card with specified specification, such that the memory card with specified specification can be inserted through while a memory card with distinct thickness will contact the bumps 36, 36' at both sides and drives the rotation of slider 31 to complete the insertion of memory card.

Figure 3:
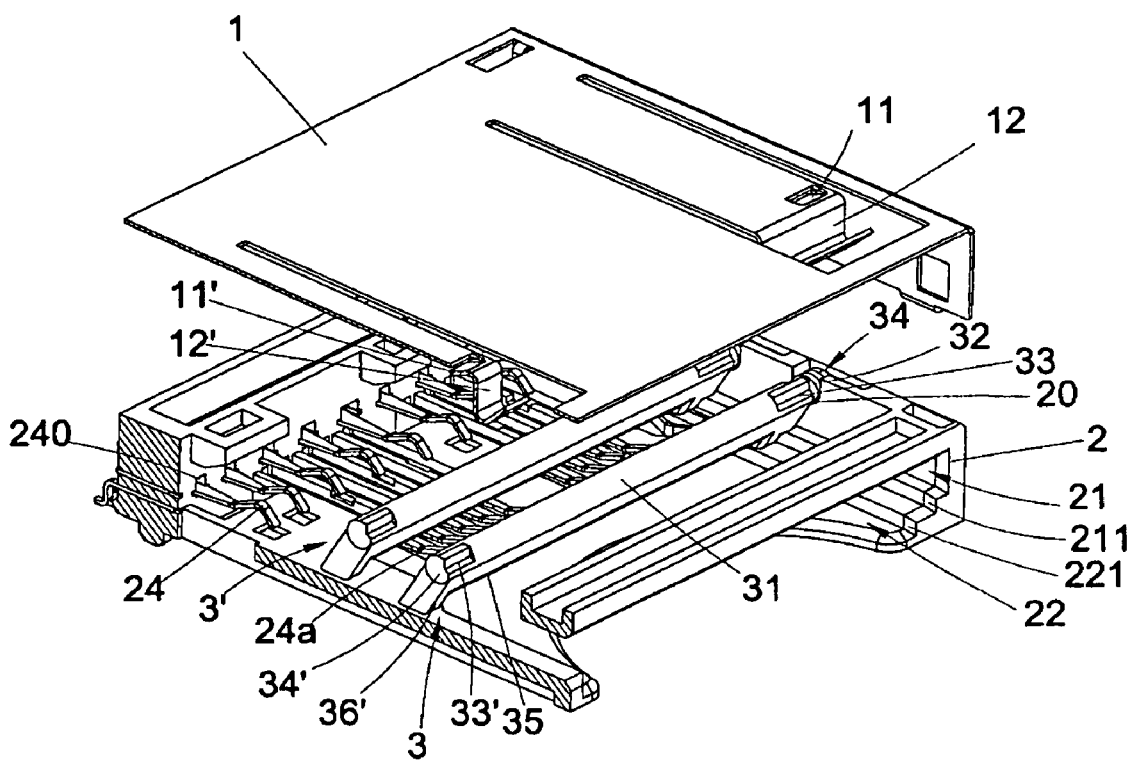
FIG. 3 shows an A—A sectional view according to the present invention.
Figure 4:
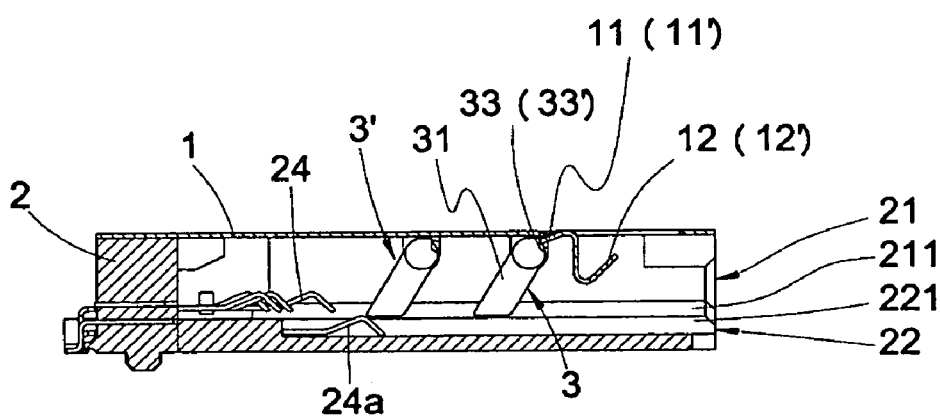
FIG. 4 shows a side view from A—A section according to the present invention.

Further, referring to FIGS. 3 and 4, resist slots 33, 33' are separately provided on the axle parts 34, 34' at two sides of slider 31, where the resist slots 33, 33' corresponds to the resist lock parts 11, 11' of the upper cover 1, such that when the elastic lock parts 12, 12' are raised by a memory card with specified specification, the resist lock parts 11, 11' release the resist against to the resist slots 33, 33', and enable the slider 31 to perform free rotation. On the other hand, when a memory card with specified specification is not able to raise the elastic lock parts 12, 12', the resist lock parts 11, 11' will not release the resist against to the resist slots 33, 33', and the free rotation performed by the slider 31 is thus restricted.

Figure 5:
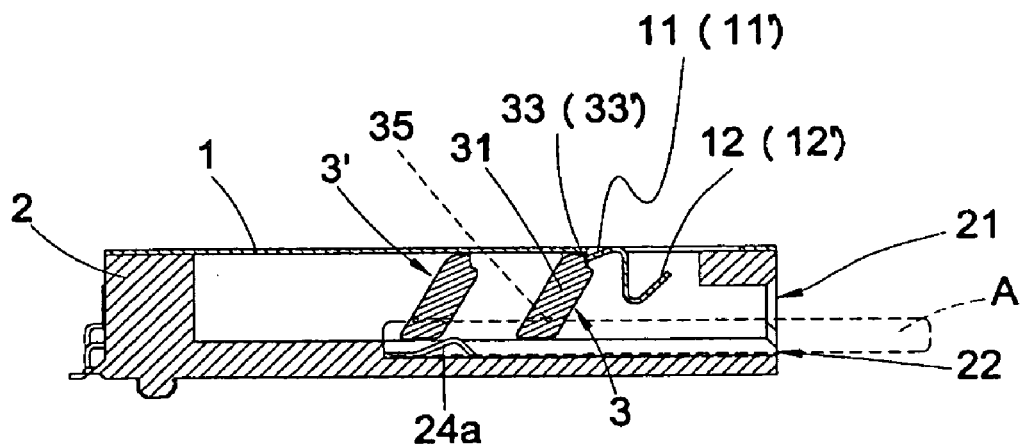
FIG. 5 illustrates the action of read-protection device according to the present invention.
Figure 6:
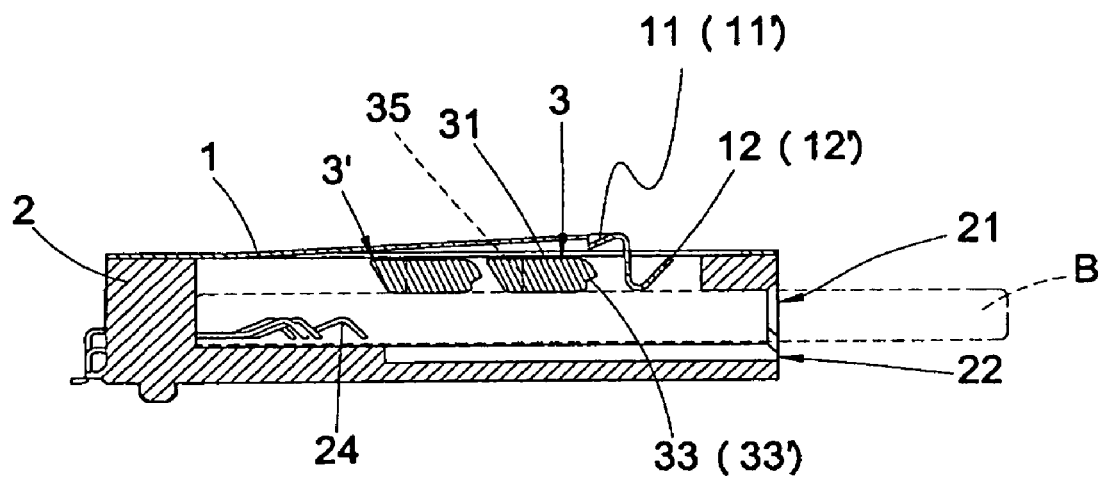
FIG. 6 also illustrates the action of read-protection device according to the present invention.

Furthermore, referring to FIGS. 5 and 6, when a thin memory card A is inserted, the height-drop 221 of step is a structural design for read-protection which drives the memory card A to go through the lower slot 22. As the width span of memory card A is narrow, it can go through the concave part 35 of two read-protection devices 3, 3' and contacts the preceding connecting terminals 24a to complete the insertion of thin memory card A. On the other hand, when a thick memory card B is inserted, the height-drop 221 of step is a structure for read-protection, which drives the memory card B to go through the upper slot 21. As the memory card B has broader width span, it raises the elastic lock parts 12, 12' during insertion, and simultaneously contacts the bumps 36 at both sides of slider 31. After the elastic lock part 12, 12' are raised, the resist lock parts 11, 11' at the rear side accordingly escape from the resist slots 33, 33' of slider 31, the constraint applied by the slider 31 is released, the slider 31 rotates backwards to accept the insertion of memory card B. After sequentially passing two read-protection devices 3, 3', memory card B contacts the subsequent connecting terminals 24.

By way of the structural design of read-protection devices 3, 3', memory cards with distinct specifications can share one socket, the size of the whole socket of card reader is accordingly scaled down, and which is favorable for related manufacturers to integrate the present invention into their products.

The invention claimed is:

1. A structure for a socket of a multi-card reader, wherein the socket of the multi-card reader supports the insertion of diverse memory cards with distinct specifications, and which at least includes an upper cover, a socket body, multiple connecting terminals and read-protection devices, wherein:

the upper cover covers and is in combination with the socket body, and an elastic part is provided atop the upper cover to interlock a resist part and thus control a free rotation of the read-protection device;

connecting terminals are provided inside the socket body, while at corresponding positions on both side walls of the socket body axle bases are provided for pivoting a slider;

the multiple connecting terminals are made from metallically conductive materials for contacting a memory card and thus for delivering information and power;

the read-protection devices include:

the slider, which uses one end as an axle to constrain the insertion of the memory card, is provided with a concave part at the bottom of the slider while bumps are formed at both sides of the slider, and resist slots are provided at the axle part of the slider to support the control applied by the resist part of the upper cover, and a recovery device is provided at the axle part;

the recovery device uses the socket body as a bearing point to provide energy for recovering the slider;

the read-protection devices are pivotally installed in the socket of the card reader, and utilize different thicknesses of memory cards with distinct specifications to push the elastic part of the upper cover to enable the slider to perform an action of release or resist, thus preventing mis-contact or initialization caused by inserting the memory card with distinct specification.

2. A structure for socket of multi-card reader in accordance with claim 1, wherein the connecting terminals are provided with structural design of layers and with distinct portions of contacts, such that one slot accepts insertion of memory card with distinct specification.

3. A structure for socket of multi-card reader in accordance with claim 1, wherein the recovery device is embodied on a return spring, a tension spring, or a terminal hook spring.

\* \* \* \* \*